United States Patent
Jehannet et al.

(10) Patent No.: US 9,611,087 B2
(45) Date of Patent: Apr. 4, 2017

(54) SUPPORTING DEVICE AND ASSEMBLY, AND METHOD FOR MOUNTING A PAIR OF WIPER BLADES

(75) Inventors: Jean-Pierre Jehannet, Vernon (FR); Jocelyn Veret, Etrepagny (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 372 days.

(21) Appl. No.: 14/235,161

(22) PCT Filed: Jun. 27, 2012

(86) PCT No.: PCT/EP2012/062418
§ 371 (c)(1),
(2), (4) Date: Jun. 6, 2014

(87) PCT Pub. No.: WO2013/013926
PCT Pub. Date: Jan. 31, 2013

(65) Prior Publication Data
US 2014/0284234 A1 Sep. 25, 2014

(30) Foreign Application Priority Data
Jul. 27, 2011 (FR) ...................................... 11 56860

(51) Int. Cl.
*B65D 85/68* (2006.01)
*A45C 11/26* (2006.01)
(Continued)

(52) U.S. Cl.
CPC ............ *B65D 85/54* (2013.01); *B60S 1/0491* (2013.01); *B65D 85/68* (2013.01); *B60S 1/3848* (2013.01);
(Continued)

(58) Field of Classification Search
CPC .... B60S 1/0491; B60S 1/3848; B65D 43/162; B65D 2585/6885; B65D 2585/6882; B65D 85/54; B65D 85/68
(Continued)

(56) References Cited

U.S. PATENT DOCUMENTS 3,885,265 A * 5/1975 Deibel .................. B60S 1/3801
15/250.452
6,779,661 B1 * 8/2004 Kotlarski .............. B60S 1/3879
206/335

(Continued)

FOREIGN PATENT DOCUMENTS

FR     2 900 133 A1   10/2007
WO    2010/037541 A2   4/2010

OTHER PUBLICATIONS

International Search Report for corresponding International Application No. PCT/EP2012/062418, mailed Sep. 3, 2012 (4 pages).

*Primary Examiner* — Luan K Bui
(74) *Attorney, Agent, or Firm* — Osha Liang LLP

(57) ABSTRACT

The present invention relates to a device for supporting a pair of wiper blades (12, 26; 13, 27), comprising first and second supporting grooves (14, 28), each of which is provided with a means for retaining at least one laterally extending structural element (22; 54) of two respective blades (12, 26; 13, 27) by resilient nesting. According to the invention, the supporting grooves (14, 28) are arranged side by side with a common wall, the supporting grooves having two respective openings leading into parallel and offset planes (R1, R2), the second supporting groove (28) being arranged above the first supporting groove (14) and having a substantially flared shape, wherein said openings belong to a single side of the supporting device. The present invention also relates to a supporting assembly comprising a plurality of supporting devices, and to a corresponding mounting method.

11 Claims, 4 Drawing Sheets

Figure 1:
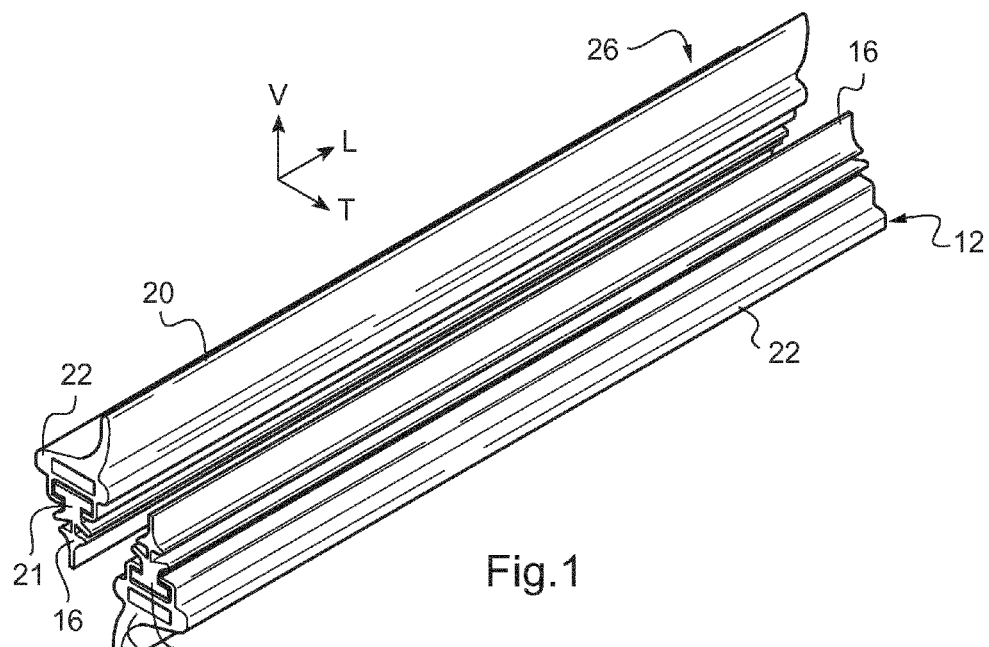

(51) Int. Cl.
 *B65D 85/00* (2006.01)
 *B60S 1/04* (2006.01)
 *B60S 1/38* (2006.01)

(52) U.S. Cl.
 CPC ............... *B60S 2001/3843* (2013.01); *B65D 2585/6885* (2013.01); *Y10T 29/49826* (2015.01)

(58) Field of Classification Search
 USPC ............... 206/335, 349; 15/250.32; 29/428; 248/68.1, 69, 74.1, 74.2, 634
 See application file for complete search history.

(56) References Cited

U.S. PATENT DOCUMENTS

| | | | | |
|---|---|---|---|---|
| 7,527,151 B2* | 5/2009 | Park | ............... | B65D 25/10 206/335 |
| 7,975,849 B2* | 7/2011 | Kim | ............... | B65D 43/162 206/470 |
| 8,042,690 B2* | 10/2011 | Lewis | ............... | B65D 43/162 206/470 |
| 8,613,357 B2* | 12/2013 | Putnam | ............... | B65D 43/162 206/335 |
| 2004/0251386 A1* | 12/2004 | Mizukoshi | ............... | F16L 3/223 248/68.1 |
| 2005/0045775 A1* | 3/2005 | Kato | ............... | F16L 3/13 248/68.1 |
| 2005/0098688 A1* | 5/2005 | Miarka | ............... | F16L 3/223 248/68.1 |
| 2005/0253025 A1* | 11/2005 | Benoit | ............... | F16L 3/13 248/74.1 |
| 2007/0284485 A1* | 12/2007 | Kato | ............... | F16L 3/223 248/68.1 |
| 2009/0049638 A1* | 2/2009 | Jehannet | ............... | B60S 1/3848 15/250.32 |
| 2009/0166489 A1* | 7/2009 | Volchko | ............... | F16L 3/223 248/74.1 |
| 2013/0327665 A1* | 12/2013 | Jehannet | ............... | B65D 85/54 206/372 |
| 2015/0158626 A1* | 6/2015 | Herinckx | ............... | B65D 77/042 206/335 |

* cited by examiner

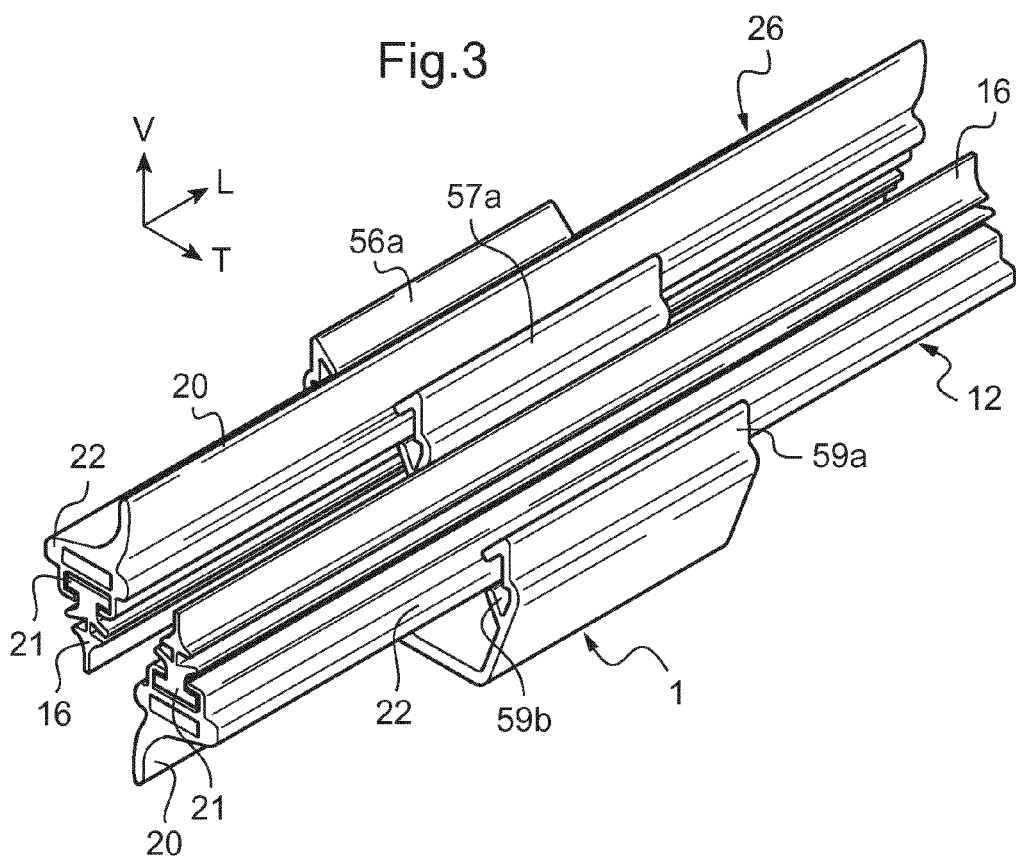
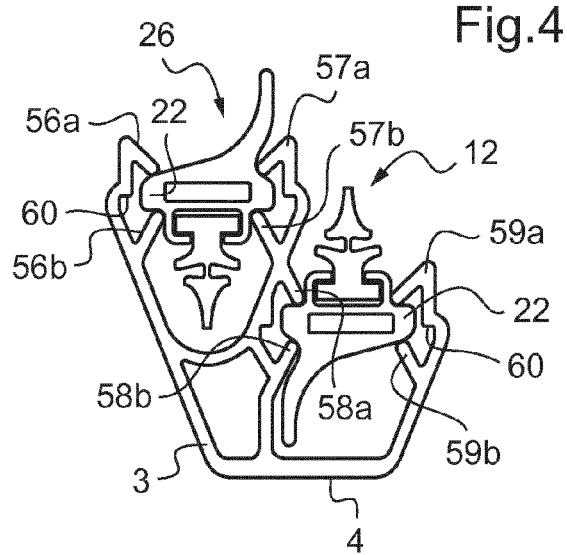

SUPPORTING DEVICE AND ASSEMBLY, AND METHOD FOR MOUNTING A PAIR OF WIPER BLADES

The present invention relates to a supporting device for a pair of windscreen wiper blades. The invention also relates to a supporting assembly comprising one or a plurality of supporting devices, as well as a corresponding mounting method.

The supporting device housing the windscreen wiper blades is, for example, intended to be used for the marketing, on store shelving, of a replacement kit of a pair of windscreen wiper blades for a vehicle or with a view to transporting a pair of windscreen wiper blades from the place of its production to the place of its packaging or to the place of its assembly on a motor vehicle.

Such a device is, for example, described in the French patent application published under the number FR 2 900 133. To fix the windscreen wiper blades in this rail-form device, a first blade is positioned facing a first open channel of the device, its wiping blade being directed toward the interior of this channel. Pressure is then applied in a direction normal to a median plane of the rail, toward the bottom of the first channel, fixing the blade by elastic fitting of a structural element in retaining means arranged in pairs at different points of the first channel. Then, the assembly consisting of the first blade fixed to the supporting device is turned over to proceed with the fixing of a second windscreen wiper blade in a second channel of the supporting device.

The invention proposes a packaging solution for a pair of windscreen wiper blades that makes it possible to simplify the mounting method with reduced bulk.

To this end, the subject of the present invention is a device for supporting a pair of windscreen wiper blades comprising a first and a second supporting grooves respectively provided with retaining means based on the elastic fitting of at least one laterally extending structural element of two respective blades, characterized in that the supporting grooves are arranged side by side with a common wall, the supporting grooves having two respective openings emerging in planes that are parallel and offset, the second supporting groove being arranged above the first supporting groove and having a substantially flared form, said openings belonging to one and the same side of the supporting device.

According to one or more features of the supporting device, taken alone or in combination:
- the bottom of the second supporting groove is arranged substantially at the height of the retaining means of the first supporting groove,
- the retaining means comprise two pairs of elastic coupling tabs formed longitudinally in the respective supporting grooves and being able to cooperate in pairs to clip at least one laterally extending structural element of the windscreen wiper blades,
- the retaining means comprise a longitudinal shoulder provided between each pair of elastic coupling tabs, being able to cooperate with an elastic coupling tab to clip at least one laterally extending structural element of the windscreen wiper blade,
- the supporting device comprises a reinforcing wall connecting the bottoms of the two supporting grooves,
- the supporting device is produced in a single piece by extrusion, plastic injection or thermoforming,
- the supporting device is made of a plastic material,
- the supporting device is made up of two elements securely attached together by bonding, welding, by fitting, or by clipping,
- the laterally extending structural element of a windscreen wiper blade can, for example, be formed by a vertebra of the blade of the windscreen wiper blade or by a lateral protuberance from the windscreen wiper blade support frame.

Another subject of the invention is an assembly for supporting a pair of windscreen wiper blades comprising: a pair of windscreen wiper blades and a plurality of supporting devices as described previously, distributed over the length of the pair of windscreen wiper blades.

Another subject of the invention is a packaging for a pair of windscreen wiper blades comprising a supporting device as described previously.

Another subject of the invention is a method for mounting a pair of windscreen wiper blades in a supporting device as described previously, characterized in that it comprises the following steps:
- fixing a first of the two blades to the supporting device by insertion of the first blade in a first direction of insertion into a first supporting groove,
- fixing the second of the two blades to the supporting device comprising the first blade by insertion of the second blade in a second direction of insertion from the same side as the first direction of insertion, into a second supporting groove.

According to an exemplary embodiment of the mounting method, the windscreen wiper blades are mounted head-to-tail in the supporting device.

The arrangement of the supporting grooves allows for the insertion of the pair of blades from the top of the supporting device, which provides for a time saving. In practice, the fitter saves on an assembly step in the method for mounting the pair of blades in the supporting device or devices compared to the devices of the prior art for which the device had to be turned over after the fixing of a first of the two blades for the fixing of the second blade.

Furthermore, the form and the offset arrangement of the supporting grooves brings the windscreen wiper blades closer together, which makes it possible to reduce the lateral bulk of the supporting assembly comprising the windscreen wiper blades. The boxed packaging of the supporting assembly is thus made easier.

The supporting of the blades by at least one laterally extending structural element of a blade is particularly shrewd because the support can then be adapted to several types of blade, notably the first and second generations of flat blades, but also for flat blades of different structure. The expression "structural element" should be understood to mean a vertebra, a support frame, a baffle or any other element forming the windscreen wiper blade.

Moreover, the supporting device is common to a plurality of embodiments of windscreen wiper blades.

Figure 2:
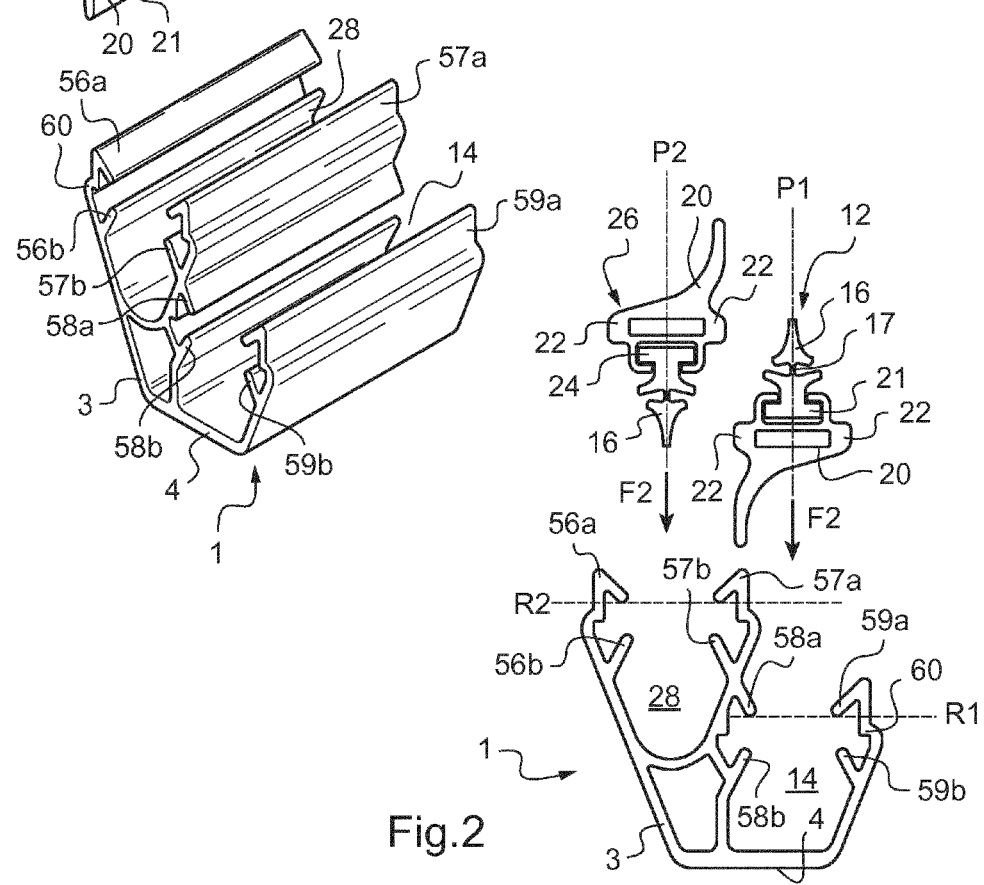
Figure 5:
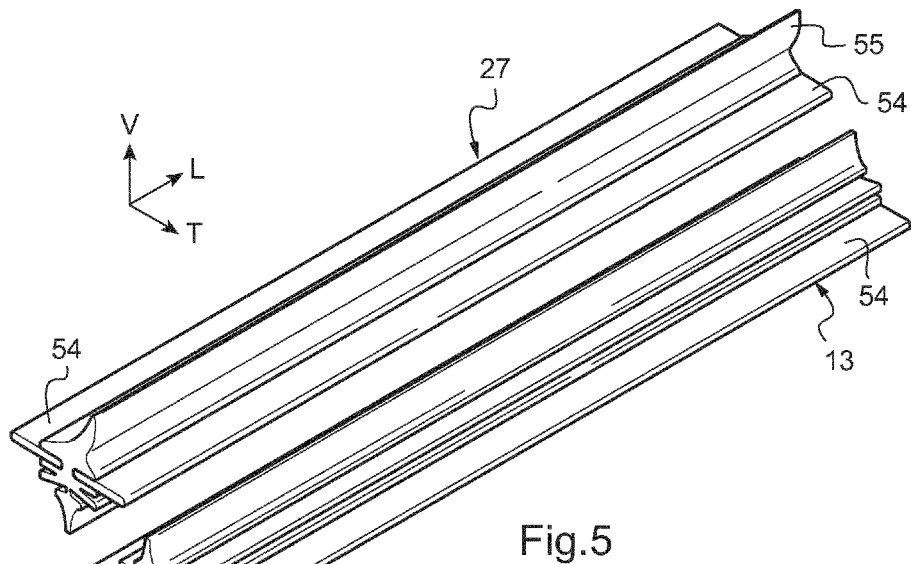
Figure 6:
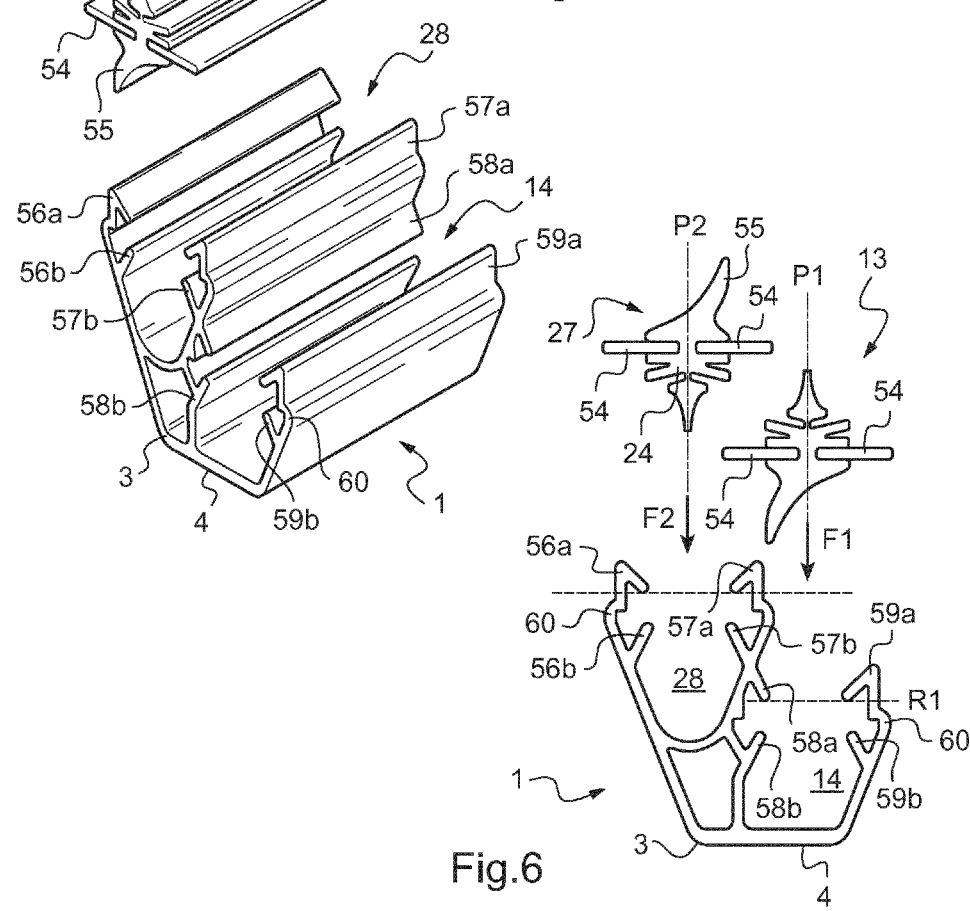
Figure 7:
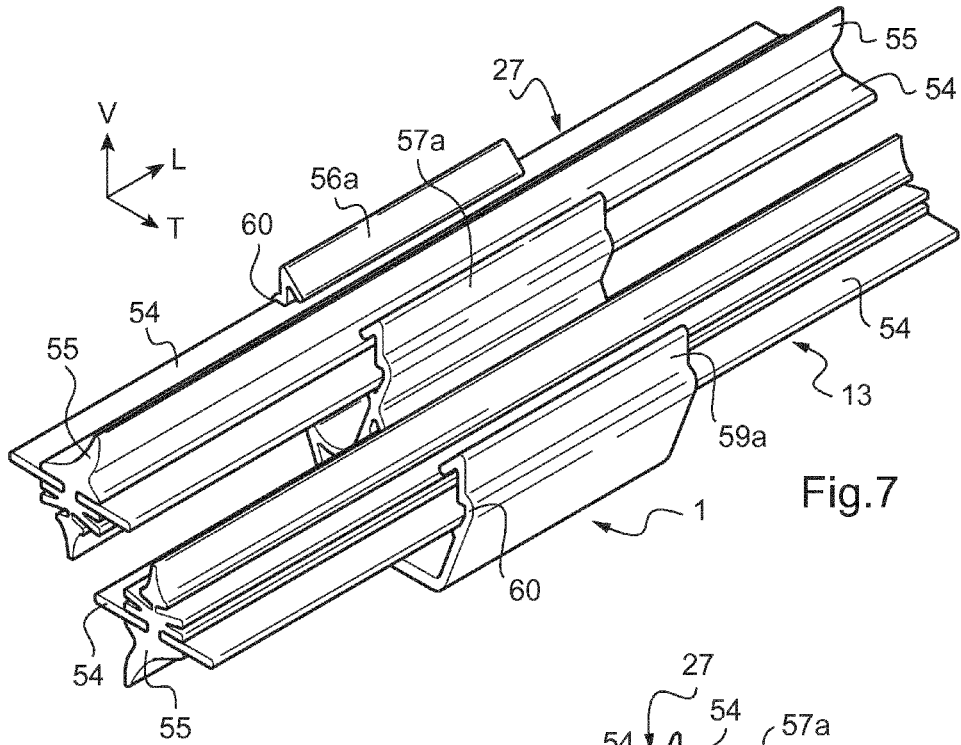
Figure 8:
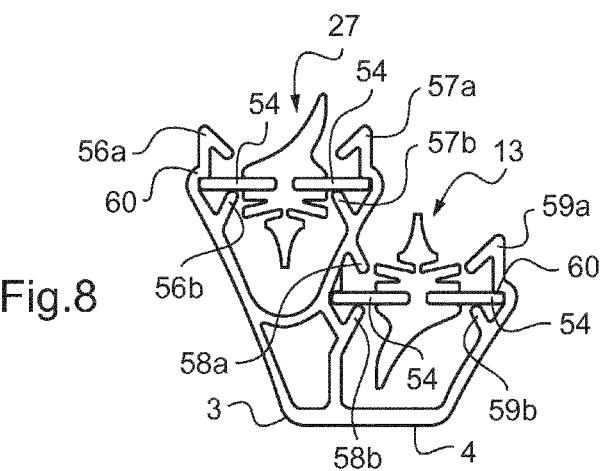
Figure 9:
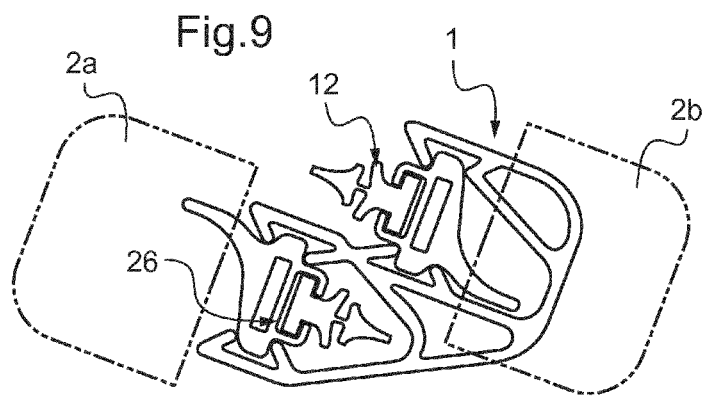

Other features and advantages of the invention will emerge from the following description, given as a nonlimiting example, in light of the appended drawings in which:

FIG. 1 represents a perspective view from the side of two windscreen wiper blade portions according to a first embodiment in the process of being mounted in a supporting device, FIG. 2 represents a substantially front view of the two windscreen wiper blade portions and of the supporting device of FIG. 1, FIG. 3 represents a perspective view from the side of the two windscreen wiper blade portions of FIG. 1 mounted in the supporting device, FIG. 4 represents a substantially front view of the two windscreen wiper blade portions and of the supporting device of FIG. 3, FIG. 5 represents a perspective view from the side of two windscreen wiper blade portions according to a second embodiment in the process of being mounted in the supporting device, FIG. 6 represents a substantially front view of the two windscreen wiper blade portions and of the supporting device of FIG. 5, FIG. 7 represents a perspective view from the side of the two windscreen wiper blade portions of FIG. 5 mounted in the supporting device, FIG. 8 represents a substantially front view of the two windscreen wiper blade portions and of the supporting device of FIG. 7, and FIG. 9 represents a cross-sectional view of a packaging for a pair of windscreen wiper blades mounted in the supporting device.

In these figures, identical elements bear the same reference numbers.

Hereinafter in the description, longitudinal, vertical and transversal directions indicated in FIG. 1 by the trihedron (L, V, T) fixed in relation to the supporting device 1 will be adopted in a nonlimiting manner. The longitudinal direction L corresponds to the main direction of the windscreen wiper blades when flat. As the supporting device 1 is illustrated, the horizontal plane corresponds to the plane (L, T). The "up" and "down" orientations are designated with reference to the orientation of the supporting device of FIG. 1.

The supporting device 1 is adapted to receive a pair of windscreen wiper blades, such as the so-called "second generation" blades of Flat Blade type, of curved form. It comprises a piece, for example made of plastic material, obtained by extrusion, plastic injection or by thermoforming, or any other material.

A portion of a first windscreen wiper blade 12 ready to be mounted on the supporting device 1 is represented above the latter, vertically above an opening of a first supporting groove 14 of the supporting device 1.

This first blade 12 extends longitudinally in the direction L. Its wiping blade 16 is borne by a support frame 20 which, by a particular aerodynamic form (baffle), can fulfill a spoiler function aiming to enhance the adhesion of the blade 12 to the glazed surface. The support frame 20 also has an internal longitudinal housing making it possible to accommodate an internal vertebra 21 and extends transversally by two overmolded lateral protuberances 22. The support frame 20 is, for example, of a single piece and produced in a material different from that of the wiping blade 16. The first windscreen wiper blade 12 also comprises, arranged approximately at its center on the longitudinal axis, a connector 2a (FIG. 9) intended to enable it to be connected to a first windscreen wiper driving arm generally linked to a motor.

The wiping blade 16 has a longitudinal narrow section 17, referred to by the term hinge, enabling it to pivot relative to the longitudinal axis L upon each change of direction when the first blade 12 is actuated by the corresponding windscreen wiper arm against the glazed surface. At rest, the wiping blade 16 exhibits a longitudinal plane of symmetry P1.

A portion of a second windscreen wiper blade 26 ready to be mounted on the supporting device 1 is also represented above the latter, vertically above an opening of a second supporting groove 28 of the supporting device 1.

Like the first blade 12, this second blade 26 of Flat Blade type extends longitudinally in the direction L. Its wiping blade 16 is borne by the support frame 20 having a longitudinal housing for an internal vertebra 21 and extending transversely by two overmolded lateral protuberances 22. At rest, the wiping blade 16 exhibits a longitudinal plane of symmetry P2.

The supporting grooves 14, 28 of the supporting device 1 are respectively provided with retaining means based on the elastic fitting of the respective structural elements of the two blades 12, 26. These retaining means are formed on the parallel wall extensions of the first and second supporting grooves 14, 28 so as to hold a respective lateral protuberance 22 of the blade to be fixed 12, 26.

The supporting grooves 14, 28 are arranged side by side with a common vertical wall. They respectively have two openings emerging in vertically offset parallel planes R1, R2 (FIG. 2). The second supporting groove 28 is arranged above the first supporting groove 14 and has a substantially flared form, "V"-shaped in the illustration. For example, and as represented in the figures, the bottom of the second supporting groove 28 is arranged substantially at the height of the retaining means of the first supporting groove 14.

The retaining means comprise, for example, a first and a second pair of elastic coupling tabs 56a, 56b, 57a, 57b and 58a, 58b, 59a, 59b formed longitudinally on the parallel wall extensions of the first and second supporting grooves 14, 28 to clip the lateral protuberances 22 of the support frames 20 of the windscreen wiper blades 12, 26. More specifically, the pairs of elastic coupling tabs 56a, 56b, 57a, 57b and 58a, 58b, 59a, 59b are vertically offset and arranged facing one another, so as to delimit two furrows that can clip, by elastic deformation, the lateral protuberances 22 of the support frames of the windscreen wiper blades 12, 26. The elastic coupling tabs 56a, 56b, 57a, 57b and 58a, 58b, 59a, 59b are, for example, made of the same material as the supporting device 1, for example by extrusion, plastic injection or thermoforming.

Furthermore, the supporting device 1 can have a reinforcing wall 3, connecting the bottoms of the two supporting grooves 14, 28 to ensure their strength. The bottom 4 of the first supporting groove 14 can be flat (parallel to the plane (L, T)) to place the supporting device 1 flat on a mounting station.

The supporting device 1 can also include a locking means holding the windscreen wiper blades in the supporting device 1, on either side of the connectors 2a, 2b. The locking means comprises, for example, holding straps or a crimping means, to ensure the inviolability of the windscreen wiper blades in the supporting device 1 after the insertion of the blades.

In order to mount the first windscreen wiper blade 12 in the supporting device 1, the fitter exerts a pressure on this first windscreen wiper blade 12 toward the bottom of the first supporting groove 14 in a vertical first direction of insertion (according to V). The fitter thus spreads the walls of the first supporting groove 14 apart to house and immobilize the lateral protuberances 22 of the first windscreen wiper blade 12 in the retaining means 58a, 58b, 59a, 59b.

The operator then proceeds to mount the second windscreen wiper blade 26 in the supporting device 1 by the same procedure. For this, he or she exerts a pressure in a direction F2 parallel to the direction of insertion F1 of the first blade 12, in the same direction and from the same side, toward the bottom of the second supporting groove 28 of the supporting device 1.

The fitter can, of course, proceed by mounting the second windscreen wiper blade 26 before mounting the first windscreen wiper blade 12.

In the fitted position of the pair of blades 12, 26 (see FIGS. 3, 4 and 9), the two longitudinal planes of symmetry P1, P2 of the blades 16 of the respective blades are substantially parallel to one another.

Although the first groove 14 of the supporting device 1 receives the first blade 12 with the wiping blade 16 oriented upward, in the opposite direction to the wiping blade of the second blade 26 oriented downward, it is possible to house the first blade 12 in the inverse direction in the first groove, wiping blade 16 downward, and the second blade 26 in the second groove, wiping blade 30 upward.

However, when the windscreen wiper blades are mounted head-to-tail in the supporting device 1, that is to say by reversing the orientation of the first and of the second blades, the forces retaining the blades in the supporting device(s) are balanced for a better flat support of the curved blades.

The arrangement of the supporting grooves 14, 28 makes it possible to insert the pair of blades 12, 26 from the top of the supporting device 1, which allows for a time saving. In practice, the fitter saves on an assembly step in the method for mounting the pair of blades 12, 26 in the supporting device or devices 1 compared to the devices of the prior art for which the device had to be turned over after the fixing of a first of the two blades for the fixing of the second blade.

In order to securely support the pair of blades 12, 26, it is possible to provide a number of independent and identical supporting devices 1. Two to four supporting devices are, for example, provided, evenly distributed on either side of the connectors 2a, 2b. The supporting assembly comprising the windscreen wiper blades and the supporting device or devices can be marketed as such in stores, or housed in a specific box.

The form and the offset arrangement of the supporting grooves brings the windscreen wiper blades closer together, which makes it possible to reduce the lateral bulk of the supporting assembly comprising the windscreen wiper blades. The boxed packaging of the supporting assembly is thus made easier (FIG. 9).

According to a second embodiment of the windscreen wiper blades represented in FIGS. 5, 6, 7 and 8, the so-called "first generation" windscreen wiper blades 13, 27 of Flat Blade type respectively comprise two lateral vertebrae 54, for example metallic, inserted and fixed in two lateral notches extending longitudinally in the support frame 55. Furthermore, the wiping blade borne by the structural element of the blade 13, 27 is, in this example, made of the same material as the support frame 55.

The retaining means of the supporting device 1 comprise a longitudinal shoulder 60 provided in each supporting groove wall 14, 28 between two elastic coupling tabs.

The second supporting groove 28 thus has a first shoulder 60 between the pairs of elastic coupling tabs 56a and 56b and a second shoulder 60 between the pairs of elastic coupling tabs 57a and 57b. The two shoulders 60 facing one another cooperate with the bottom elastic coupling tabs 56b and 57b to clip, by elastic deformation, the lateral vertebrae 54 of the support frames of the windscreen wiper blades 13, 27. The same shoulders are formed in the first supporting groove 14.

The supporting device 1 can therefore be common to all types of windscreen wiper blades. In the case of the mounting of second generation Flat Blade type windscreen wiper blades, these shoulders 60 are inactive (see FIG. 4).

The invention claimed is:

1. A supporting device for supporting a pair of windscreen wiper blades comprising:
    a first supporting groove for holding a first windscreen wiper blade of the pair of windscreen wiper blades, the first supporting groove comprising:
        a first bottom of the first supporting groove; and
        a first opening, opposite of the first bottom, comprising:
            a first retaining means configured to prevent the first windscreen wiper blade, when held by the first supporting groove, from contacting the first bottom;
    a second supporting groove for holding a second windscreen wiper blade of the pair of windscreen wiper blades, the second supporting groove comprising:
        a second bottom; and
        a second opening, opposite of the second bottom, comprising:
            a second retaining means configured to prevent the second windscreen wiper blade, when held by the second supporting groove, from contacting the second bottom;
    wherein the first supporting groove and the second supporting groove an arranged side by side with a common wall,
    wherein the first opening is in a first plane, the second opening is in a second plane, the first plane is parallel to the second plane, and the first plane is offset from the second plane,
    wherein the first supporting groove has a substantially flared form,
    wherein the second supporting groove has a substantially flared form,
    wherein the first supporting groove and the second supporting groove are disposed on a same side of the supporting device.

2. The supporting device as claimed in claim 1, wherein the second bottom of the second supporting groove is arranged substantially at the height of the first retaining means of the first supporting groove.

3. The supporting device as claimed in claim 1, wherein the first retaining means comprises two pairs of elastic coupling tabs formed longitudinally in the first supporting groove, wherein the first retaining means is configured to hold the first windscreen wiper blade.

4. The supporting device as claimed in claim 3, wherein the first retaining means further comprises a longitudinal shoulder provided between a pair of the two pairs of elastic coupling tabs.

5. The supporting device as claimed in claim 1, further comprising a reinforcing wall connecting the first bottom and the second bottom.

6. The supporting device as claimed in claim 1, wherein the device is produced in a single piece by extrusion, plastic injection or thermoforming.

7. An assembly for supporting a pair of windscreen wiper blades comprising:
    a pair of windscreen wiper blades; and
    a plurality of supporting devices as claimed in claim 1, distributed over the length of the pair of windscreen wiper blades.

8. A packaging for a pair of windscreen wiper blades comprising the assembly as claimed in claim 7.

9. A mounting method for mounting a pair of windscreen wiper blades in the supporting device as claimed in claim 1, further comprising:

fixing the first windscreen wiper blade to the supporting device by insertion of the first windscreen wiper blade in a first direction of insertion into the first supporting groove; and fixing the second windscreen wiper blade to the supporting device by insertion of the second windscreen wiper blade in a second direction of insertion from the same side as the first direction of insertion, into the second supporting groove.

10. The mounting method as claimed in claim 9, wherein the windscreen wiper blades are mounted head-to-tail in the supporting device.

11. A system, comprising:
a pair of windscreen wiper blades comprising:
  a first wiper blade comprising a first protuberance that extends laterally from a body of the first wiper blade; and
  a second wiper blade comprising a second protuberance that extends laterally from a body of the second wiper blade;
a supporting device for supporting the pair of windscreen wiper blades, the supporting device comprising:
  a first supporting groove comprising first bottom and first retaining means;
  a second supporting groove comprising second bottom and second retaining means;
wherein the first retaining means has a cross section shape that corresponds to a portion of a cross section of the first protuberance,
wherein the second retaining means has a cross section shape that corresponds to a portion of a cross section of the second protuberance,
wherein the first supporting groove and the second supporting groove are arranged side by side with a common wall,
wherein the first retaining means is in a first plane, the second retaining means is in a second plane, the first plane is parallel to the second plane, and the first plane is offset from the second plane,
wherein the first supporting groove has a substantially flared form,
wherein the second supporting groove has a substantially flared form,
wherein the first supporting groove and the second supporting groove are disposed on a same side of the supporting device.

* * * * *